(12) United States Patent
Paden et al.

(10) Patent No.: US 7,936,862 B2
(45) Date of Patent: May 3, 2011

(54) INTELLIGENTLY PROVIDING DIALUP ACCESS NUMBERS USING AN AUTOMATED VOICE RESPONSE SYSTEM

(75) Inventors: Jon Paden, Austin, TX (US); Bobby Sams, Austin, TX (US); Kurt M. Joseph, Austin, TX (US); Wei Li, Yorktown Heights, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 741 days.

(21) Appl. No.: 12/014,396

(22) Filed: Jan. 15, 2008

(65) Prior Publication Data
US 2008/0137815 A1    Jun. 12, 2008

Related U.S. Application Data

(63) Continuation of application No. 10/965,419, filed on Oct. 14, 2004, now Pat. No. 7,346,152.

(51) Int. Cl.
*H04M 11/00* (2006.01)
(52) U.S. Cl. .................. 379/93.01; 709/239
(58) Field of Classification Search ............ 707/10, 707/3; 370/352; 709/200, 227, 238, 249, 709/239; 379/88.17, 88.16, 93.01
See application file for complete search history.

(56) References Cited

U.S. PATENT DOCUMENTS

| | | | |
|---|---|---|---|
| 6,188,751 B1 | 2/2001 | Scherer | |
| 6,343,360 B1 | 1/2002 | Feinleib | |
| 6,571,290 B2 | 5/2003 | Selgas et al. | |
| 6,608,892 B2 | 8/2003 | Shaffer et al. | |
| 6,795,852 B1 * | 9/2004 | Kleinrock et al. | 709/220 |
| 2001/0001866 A1 | 5/2001 | Kikinis | |
| 2002/0083429 A1 | 6/2002 | Rozenfeld | |
| 2002/0095474 A1 | 7/2002 | Boys | |
| 2003/0050922 A1 | 3/2003 | Sanghavi | |
| 2003/0097450 A1 | 5/2003 | Ogg | |

* cited by examiner

*Primary Examiner* — Olisa Anwah
(74) *Attorney, Agent, or Firm* — Greenblum & Bernstein, P.L.C.

(57) ABSTRACT

A method for an automated voice response system to present access numbers to dial-up Internet users. The automated voice response system can perform the step of establishing a telephony communication with a party responsive to a received telephone call from the party. An indicator a service region within which dial-up Internet access is requested can be received by the automated voice response system. At least one data store can be queried for access numbers associated with the service region. A response to the querying step can be dynamically generated. The generated response can be customized specifically for the telephony communication. When the response includes at least one access number, the included access number or numbers can be presented to the party across the telephone communication.

20 Claims, 4 Drawing Sheets

INTELLIGENTLY PROVIDING DIALUP ACCESS NUMBERS USING AN AUTOMATED VOICE RESPONSE SYSTEM

CROSS-REFERENCE TO RELATED APPLICATIONS

This application is a continuation of U.S. patent application Ser. No. 10/965,419, filed Oct. 14, 2004, the disclosure of which is hereby incorporated by reference.

BACKGROUND

1. Field of the Invention

The present invention relates to the field of dial-up networking and, more particularly, to automatically providing dial-up access numbers to customers.

2. Description of the Related Art

Dial-up Internet users access the Internet by establishing a communication link between their computer and a computing device of an Internet Service Provider (ISP). The communication link occurs across a phone line and is established when the user contacts the ISP computer device via one or more access telephone numbers. Generally, the user will be able to select one of many access number local to the user so that telephone usage charges are minimized.

Most Internet Service Providers (ISPs) implement some form of automated technology for providing access numbers to customers over the phone in order to avoid unnecessary contacts between dialup customers and live agents due to cost and efficiency considerations. Utilized technologies for providing access numbers can include presenting customers with pre-recorded listings of possible access numbers filtered and/or sorted by area code, an area code exchange combination, city, zip code, or the like.

A problem with using a static pre-recorded list of access numbers is such a method fails to consider variables that affect whether each access numbers on the list is suitable for the calling user. For example, static lists fail to take into consideration temporary access number outages, specialized customer equipment that requires specific back-end equipment not available through each access number in the list, current load handled by the different access numbers, and other such considerations.

The static nature of conventional systems can also result in a cumbersome interface that provides users with either too much information—much of which is inapplicable to the user, too little information, or misleading information not suitable for the user's individualized needs.

What is needed is an automated means of presenting access numbers to users in an intelligent fashion that is customized to the needs of the calling user. Such an intelligent system would ideally be configured to address situational concerns of callers in a user-friendly manner, which could encourage the use of the automated system, thereby minimizing the need for live agent interactions while maintaining a high level of customer satisfaction.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention provides a system, a method, and an apparatus for intelligently providing dialup access numbers to calling users via an automated voice response system or interactive voice response system (IVR). More specifically, situational considerations can be automatically determined by the IVR. A list of access numbers can be dynamically generated based upon the situational considerations. These numbers can be audibly presented to a caller over a voice communication connection.

Figure 1:
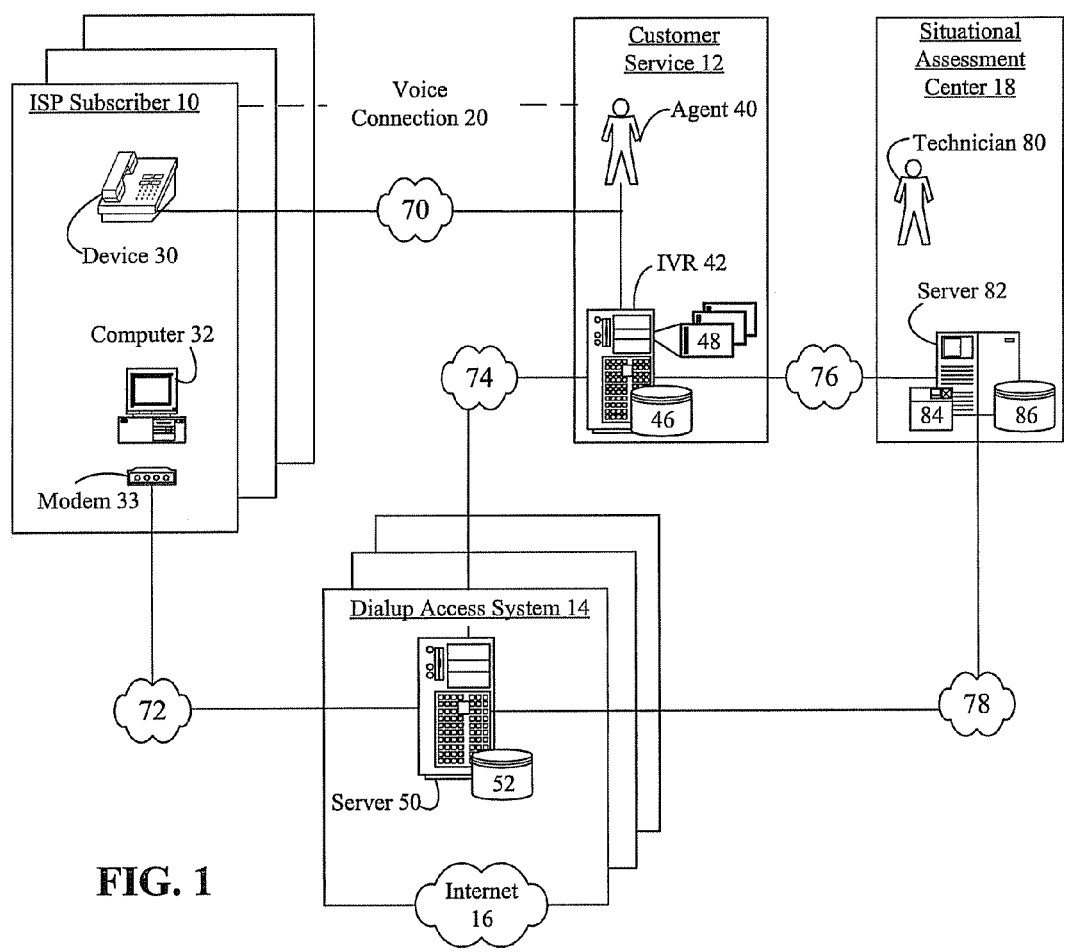
FIG. 1 is a schematic diagram illustrating an automated system for automatically presenting dialup access numbers to customers in accordance with one embodiment of the invention.

FIG. 1 is a schematic diagram illustrating an automated system 100 for automatically presenting dialup access numbers to customers in accordance with one embodiment of the invention. The system 100 can include ISP subscribers 10, a customer service center 12, a situation assessment center 18, and a dialup access system 14.

The dialup access system 14 can grant Internet 16 access to the ISP subscribers 10. Typically a computer 32 attached to a modem 33 will communicatively link to a server 50 across network 72. The server 50 will provide one or more ports to the Internet 16 that are associated with one or more dialup access numbers. The dialup access number can determine the port though which the ISP subscriber 10 is connected to the Internet 16. Dialup account information contained in data store 52 can be used authorized the ISP subscriber 10.

The customer service center 12 can receive ISP subscriber 10 calls pertaining to dialup services and can help the ISP subscriber 10 establish dial-up service. For example, the customer service center 12 can provide the ISP Subscriber 10 with one or more dialup access numbers. The provided dialup access numbers can be specific to the ISP Subscriber 10. For example, the access numbers can be local numbers for the ISP Subscriber requiring no additional telephone toll charge. The provided access numbers can be for ports of the dialup access system 14 that fully support the capabilities of the equipment used by the ISP Subscriber 10, such as the computer 32 and the modem 33.

Support functions of the customer service center 12 can be handled using one or more live agents 40 and/or an Interactive Voice Response system 42. The live agents 40 and the IVR 42 can utilize data supplied by data store 46 when interacting with an ISP subscriber 10. Data store 46 can include customer specific data, network specific data, service specific data, historical data, or the like. Interface 48 can be designed to provide the agent 40 with the necessary customer specific information to intelligently interact with the ISP Subscriber 10 and to record interaction specifics. For example, when the ISP Subscriber 10 is transferred to agent 40 by the IVR 42, information provided to IVR 42 can be made available to the agent 40 using interface 48.

As mentioned, one function of the customer service center 12 is to provide the ISP subscriber 10 an appropriate dialup access number or numbers. Towards this end, the IVR 42 can automatically present suitable access numbers to the ISP subscriber 10 using conditions accessed by the situation assessment center 18. Alternately, the agent 40 can present suitable access numbers based upon recommendations of customer service computer systems that utilize the situation assessment center 18. The customer service center 12 can be linked to the situation assessment center 18 through network 76.

The situation assessment center 18 can include a server 82 that establishes a plurality of configurable parameters, which are used to algorithmically or heuristically determine suitable access numbers for a given situation. This determination can involve a series of weighted factors used to calculate a suitability value for one or more potential access numbers. Each suitability value can be compared with one or more thresholds, where favorable comparisons result in an access number being presented to the ISP subscriber 10. When a plurality of access numbers exist that satisfy threshold conditions, those with the highest suitability value can be preferentially presented to the ISP Subscriber 10. For example, access numbers can be ordered for presentation from greatest suitability value to least suitability value.

Factors, rules, thresholds, and the like used by server 82 can be stored in data store 86. Technician 80 can use interface 84 to monitor the server 82 and adjust data within data store 86.

The customer service center 12 and the situational assessment center 18 can be linked to the dialup access center 14 through network 74 and network 78. Information in data store 46, 86, and 52 can be shared across these links. Additionally, once the ISP Subscriber 10 is connected to the dialup access system 14, client based routines and data within computer 32 can be accessed by the IVR 42, server 82, and server 50 across network 72, 74, 78, and 76 as needed assuming proper authorization is provided.

As used herein, voice link 20 can be a standard public switched telephone network (PSTN) connection, which is typically a circuit-switched connection. The voice link 20 is not limited in this regard, however, and a packet-based connection that utilizes a technology like Voice over Internet Protocol (VoIP) can also form the voice link 20.

Networks 70, 72, 74, 76, 78, and 16 can be implemented as any of a variety of fashions so long as content is conveyed using encoded electromagnetic signals. Further, any of a variety of communication devices, such as customer premise equipment (CPE), computers, modems, routers, switches, or the like, can be included within networks 70, 72, 74, 76, 78, and 16.

Each of the networks 70, 72, 74, 76, 78, and 16 can convey content in a packet-based or circuit-based manner. Additionally, each of the networks 70, 72, 74, 76, 78; and 16 can convey content via landlines or wireless data communication methods. For example, each of the networks 70, 72, 74, 76, 78, and 16 can separately include an Intranet, a local area network, a wide area network, or a combination thereof. In another example, each of the networks 70, 72, 74, 76, 78, and 16 can include a telephony network, like a mobile wireless network or a public switched telephone network (PSTN).

The data stores 46, 52, and 86 can store information in any recording medium, such as a magnetic disk, an optical disk, a semiconductor memory, or the like. Further, each of the data stores 46, 52, and 86 can utilize any information retention technique including a file-based storage technique or a database storage technique. Moreover, each of the data stores 46, 52, and 86 can be a storage area fixed to a geographical location or a storage area distributed across a network space.

It should be appreciated that the arrangements shown in FIG. 1 are for illustrative purposes only and that the invention is not limited in this regard. The functionality attributable to the various components can be combined or separated in different manners than those illustrated herein. For instance, the situation assessment center 18 can be integrated with the customer service center 12 in one embodiment of the invention disclosed herein.

Figure 2:
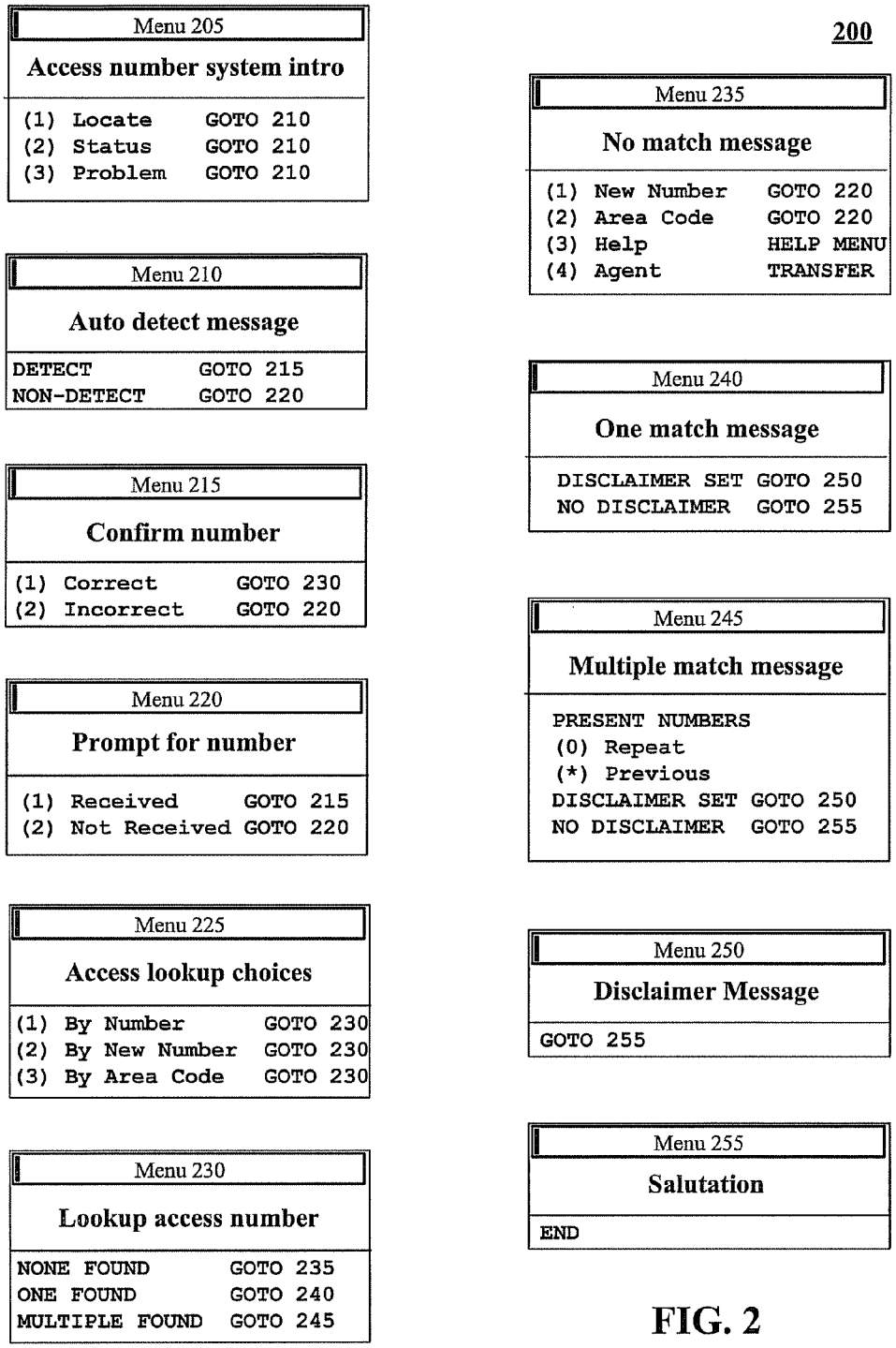
FIG. 2 is a menu structure for providing dialup access numbers in accordance with one embodiment of the invention.

FIG. 2 is a menu structure for providing dialup access numbers in accordance with one embodiment of the invention. The menu structure 200 can be utilized in the context of any of a variety automated systems. For example, the menu structure 200 can be utilized by IVR 42 of system 100.

The menu structure 200 can begin with menu 205. Menu 205 can provide an introductory message. For example, the access number system introduction can state "To find an access number in any area code in the U.S., press 1. To check the status of an access number, press 2. To report a problem on an access number, press 3." A selection of each of these options (1-3) can cause menu structure 200 to proceed to menu 210.

As indicated by the above message, the menu structure 200 can be integrated within other caller services, such as a status determination system (option 2) and a problem reporting system (option 3). These services can utilize many of the same components as those needed by the system that provides the access numbers, as shown by menu structure 200. For example, each of these services can automatically detect a phone number (menu 210) and can lookup access numbers (menu 225 and menu 230).

In one embodiment, each of these services can represent modules within, a modularized software system. Consequently, data can be shared among different modules (hence used commonly by different services), thereby reducing development and maintenance costs. Additionally, use of a common menu structure 200 by different services can create a common "look and feel" for customers, thereby minimizing customer confusion for those customers familiar with other services provided by the modularized software system.

In menu 210, an automatic detection message can be presented. For example, the automatic detection message can state "Please wait while we determine the area code you are calling from." When a detection occurs, the menu structure can proceed to menu 215: When no detection occurs, the menu structure can proceed to menu 220.

In menu 215, a confirmation message can be presented. For example, the message can state "You are calling from telephone XXX-XXX-XXXX. Is this correct." Alternatively, a city associated with the detected number can be determined and the message of menu 215 can state "Are you calling from Miami, Fla.? Press 1 for yes and press 2 for no." When the detected number (or city) is confirmed, the menu structure can proceed to menu 225. When the number is not confirmed the menu structure can proceed to menu 220.

In menu 220, a caller can be prompted for another number by a message, such as "We're sorry, but we were unable to determine the number you are calling from. Please enter your number now." When a number is received, the menu structure can branch to menu 215, where the received number can be confirmed. When the number is not received after a designated time, the menu can loop to menu 220, where the user can be re-prompted for a number.

In one embodiment, an option (menu 225) for looking up access numbers from a list can be provided. Although no entry point for menu 225 is explicitly shown in menu structure 200, it should be appreciated that a caller can be directed to menu 225 instead of menu 220 at any point. For example, if a caller incorrectly enters a phone number a designated number of times, the caller can be directed to menu 225.

In menu 225, a message can be presented to look up access numbers in one or more fashions. The message can state "To list access numbers in the geographical area of this phone number (meaning the number presented in either the auto detect message or the confirmation message of menus 210 and 215, respectively), press 1. To enter a different phone number press 2. To search for access numbers based on an area code only, press 3." Each of these selections can result in a caller selecting or entering an access number, upon which the menu structure can proceed to menu 230.

In menu 230, the received access number can be looked up and compared against a system maintained list of valid access numbers. If no access number is found, the structure can branch to menu 235. If one is found, the structure can branch to menu 240. if multiple access numbers are found, the structure can branch to menu 245.

In menu 235, a no-match message can be presented, such as "This system is unable to find any matches for the number you entered. To specify a different number, press 1; to search by area code only, press 2; to receive help, press 3, to be transferred to a live agent, press 4." Selection of 1 or 2 can result in the structure branching to menu 220, where the caller is prompted for a different calling number. Selection of option 3 can result in the caller being transferred to a help system (not shown) and being presented with a help menu. Selection of option 4 can result in the user being transferred to a live agent.

In menu 240, a message that one match has occurred can be presented, such as "there is one number listed in the specified area—that number is XXX-XXX-XXXX". The structure can branch to menu 250 if a disclaimer parameter is set and to menu 255 otherwise.

In menu 245, a multiple match message can be presented. For example, the message can state "This system lists (X) access numbers for the specified area. These numbers will be presented to you in groups of ten. During read back, you may use the zero key to repeat any number or the * key to go back to a previous group of numbers." The numbers can then be presented to the user, where the "0" and "*" key press events can alter the presentation of these numbers. The structure can branch to menu 250 if a disclaimer parameter is set and to menu 255 otherwise.

In menu 250, a disclaimer message can be presented. For example, the disclaimer can state "Please check with your local phone company as to whether or not the access number you choose is a local call for you. Each time you use the access number to log on to your service provider, your computer dials the number as if you were placing a normal telephone call. If you select and use an access number that is not a local call for you, you may incur substantial toll or long distance charges."

Other or different disclaimer or user message can also be provided. For example, a domain remainder can be presented, such as "Please note that you should always include your full user name in your dialup settings. Members should use the @ symbol as in your email address within this name in some cases. Also, user names should not include any spaces or punctuation other than the @ symbol. Please verify that your username is correct if you experience problems by going into "My Computer" under "Dial Up Networking". The structure can proceed from menu 250 to menu 255.

In menu 255 a salutation message can be presented and menu structure 200 can end. The salutation message, for example, can state "Thank you for using the automated system. You may now hang up. Good bye." In one embodiment, the ending option of menu 255 can terminate a telephony connection.

It should be noted that the menu structure 200 can be a destination point from a remote menu structure. That is, the menu structure 200 can represent a branching point to which a caller is directed upon selecting an option from the remote menu structure. Further, when used as a destination point, data flow can return to the calling menu structure, once programmatic actions dependant upon menu structure 200 are completed. In such a situation, the ending option of menu 255 can branch control to the calling menu structure instead of terminating the telephony connection, and the salutation message can indicate "caller is being transferred to XXX, please wait."

Figure 3:
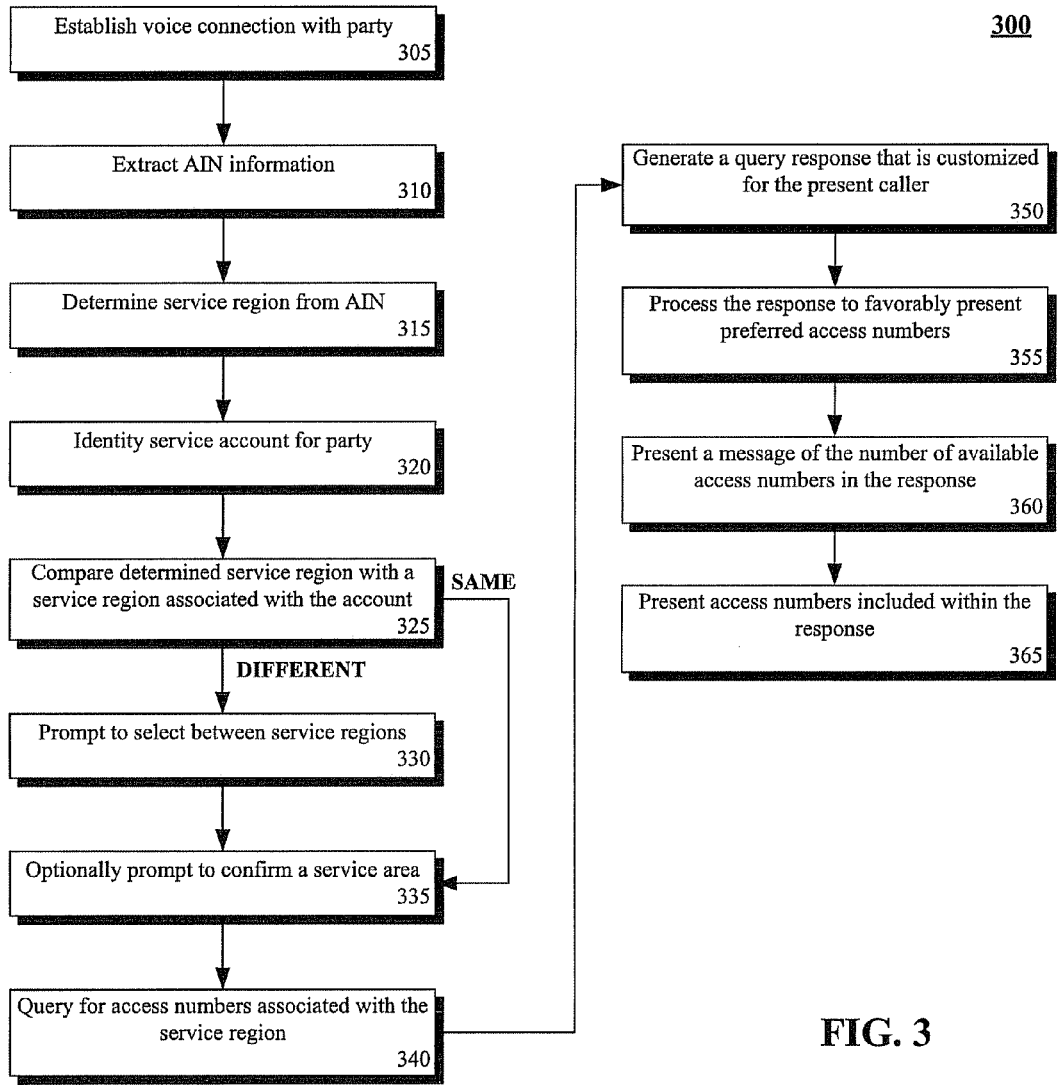
FIG. 3 is a flow chart illustrating a method for automatically presenting dialup access numbers to customers in accordance with one embodiment of the invention.

FIG. 3 is a flow chart illustrating a method for automatically presenting dialup access numbers to customers in accordance with one embodiment of the invention. The method 300 can be performed in the context of any of a variety of automated systems capable of providing users or calling parties with dialup access numbers. For example, the method 300 can be performed in the context of system 100 of FIG. 1. In another example, the method 300 can be performed by an automated voice response system that utilizes a menu structure similar to structure 200 of FIG. 2.

The method 300 can begin in step 305, where a voice connection can be established between an automated voice response system, like an IVR, and a calling party. In step 310, automatic number information (AIN) for the voice connection can be extracted. In step 315, a service region can be determined from the AIN. A service region can represent a geographical area having network points of presence that the party can access, preferably without incurring toll expenses. Thus, the service region can consist of a local telephony region or a region where local calls can be made.

In step 320, the a service account for the party can be identified. In one embodiment, this identification can occur automatically, by looking up account information associated with the AIN information. In another embodiment, the identification can require prompting the party to specify a user account. It should be noted that user accounts can be associated with a myriad of account specific data, including a service region associated with the service account, user specific hardware, user preferences, historical user connectivity data, and the like.

In step 325, the automatically determined service region can be compared with the service region associated with the account. If these service regions are the same the method can proceed to step 335. Otherwise, the method can proceed from step 325 to step 330.

In step 330, the party can be prompted to select one of the two conflicting regions or to select a different third region for which connectivity is desired. Once a region has been entered, the method can proceed to the region confirmation step, which is step 335.

It should be appreciated that often users call from different access numbers other than the one associated with the service account. For example, the user can be calling from a mobile telephone number serviced from a different area than a land based line associated with the service account, where Internet connectivity is desired for the land based line. In another example, the user can desire connectively from an unusual telephone extension, such as when the user is traveling and attempting to connect to the Internet via a notebook computer.

In step 335, which is optional, the party can be prompted to confirm that the computed service area is correct. This prompt can present an area code, a city corresponding to the service region, or other such service region indicator. When the party fails to confirm the service region (not shown) the party can be required to repetitively enter new information pertaining to a service area, until a service area is ultimately confirmed.

In step 340, a data store can be queried for access numbers associated with a service region. A query response based in part upon the queried access numbers can be dynamically generated. This response can be customized for specifics of the party and/or specifics of a service provider network used to provide the party with dialup Internet service, as shown in step 350.

In step 355, the response can be adjusted so that preferred ones of the access numbers are favorably presented. For example, access numbers capable of best supporting the parties' hardware can be presented before other access numbers. Favorably presenting access numbers can mean ordering access numbers, grouping access numbers, filtering access numbers, and combinations and derivatives thereof.

In step 360, a message of the number of available access numbers in the response can be presented to the party. This message can prepare the party for receiving numbers before those numbers are presented. In one embodiment, the party can pause the method at this point, so that a suitable writing utensil for recording presented access numbers can be obtained. In step 365, the access numbers included within the response can be presented. In one embodiment, the numbers can be presented within designed groups, such as presented within groups of ten, where the party can navigate from one group of numbers to another using touch pad keys or voice commands.

Figure 4:
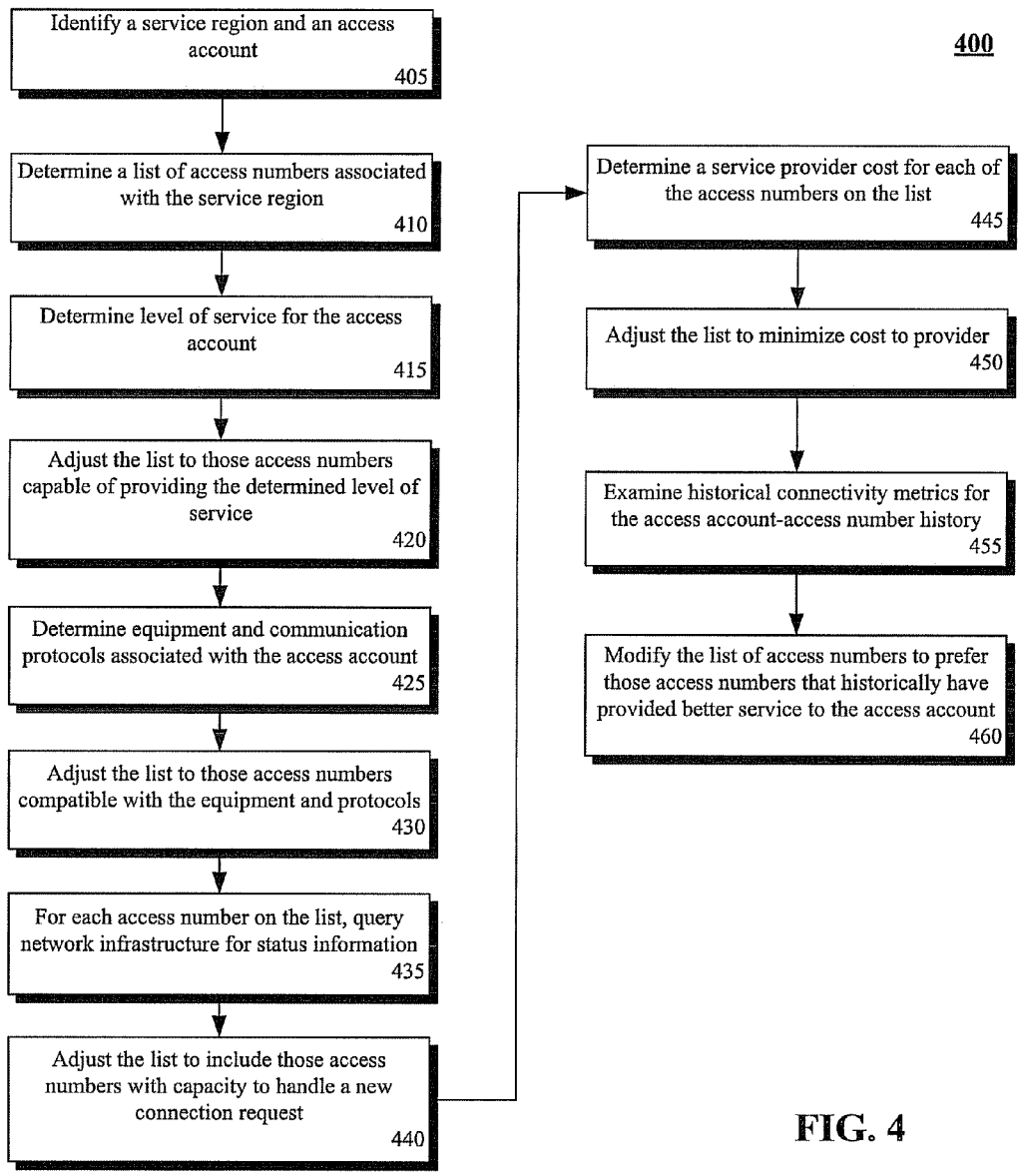
FIG. 4 is a flow chart illustrating a method for customizing access numbers for a communication session in accordance with one embodiment of the invention.

FIG. 4 is a flow chart illustrating a method 400 for customizing access numbers for a communication session in accordance with one embodiment of the invention. In one embodiment, the method 400 can be preformed during step 350 of method 300.

The method 400 can begin in step 405, where a service region and an access account can be identified. In step 410, a list of access numbers associated with the service region can be determined.

In step 415, a level of service for the access account can be determined. For example, different categories of accounts, like silver, gold, and platinum levels can exist, each indicating a minimum threshold of service that is to be provided. In step 420, the list of access numbers can be adjusted to include only those numbers capable of providing the determined level of service.

In step 425, equipment and communication protocols associated with the access account can be determined. In step 430, the list of access numbers can be adjusted to be compatible with the equipment and protocol. For example, different modem protocols require different backend support. Only a portion of the access numbers can be associated with appropriate hardware and software to fully support a client's hardware. This portion of access numbers can be preferred over other access numbers that could be used, which do not fully support the client's hardware. Access numbers associated with incompatible hardware and software can be excluded from the list of access numbers.

In step 435, a network infrastructure can be queried for information for each access number still on the list of current access numbers. In step 440, the list can be adjusted to include only those access numbers with capacity to handle new connection requests.

For example, the load on a particular access number may be so high as to exclude a new connection. Such an access number can be removed from the access list. In another example, the access numbers with the lowest load can be presented before access numbers having a higher load in order to load balance the network infrastructure. In still another example, the network infrastructure can indicate that particular ones of the access numbers are malfunctioning or experiencing problems. These numbers can be excluded from the list of access numbers.

In step 445, a service provider cost can be determined for each of the access numbers on the list. That is, often service providers will contract to utilize points of presence from one or more third party venders. Utilizing these points of presence can result in a cost to the service provider. In step 450, the list of access numbers can be adjusted to minimize the cost to the service provider.

In step 455, historical connectivity metrics can be examined. These metrics can include access account-access number pairings. These pairings can be used to compensate for telephony network idiosyncrasies that cause different access number-calling number pairings to be better than others. For example, one such pairing can generally result in a "clean" communication line, while another pairing can result in a low quality or "noisy" communication line. In step 460, the list of access numbers can be modified to prefer those access numbers that have historically provided better service to the access account.

The steps detailed within method 300 and method 400 represent one illustrative embodiment of the inventive arrangements disclosed herein. The scope of the invention is to be construed as including adaptive deviations of the method 300 and 400 that are essentially the same as steps detailed herein.

It should be noted that the various customization steps of FIG. 400 can be associated with administrator adjustable parameters. These parameters can cause different customizations to be weighted over other customizations. The customizations can be used singularly or in combination with any other customizations. Method 400 illustrates an example where multiple customizations are used to adjust the access numbers that are ultimately provided to a calling party.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:
1. A method, comprising:
   establishing a telephony communication with a party responsive to a received telephone call from the party;
   receiving an indicator of a service region within which dial-up Internet access is requested by the party;

querying at least one data store for access numbers associated with the service region;

dynamically generating a response to the querying that is customized based at least in part upon specifications of a machine used by the party to interface with a network infrastructure which provides dialup Internet service; and when the response includes at least one access number, presenting the at least one access number to the party across the telephony communication.

2. The method of claim 1, further comprising:
establishing the telephony communication, receiving the indicator of the service region and presenting the at least one access number using an automated voice response system.

3. The method of claim 1, further comprising:
when the response includes a plurality of access numbers, presenting the plurality of access numbers in order based on compatibility with the specifications of the machine used by the party.

4. The method of claim 1, further comprising:
determining a modem speed and protocol of the machine, wherein the querying matches the modem speed and protocol with information in the data store related to the access numbers, and wherein the response of the generating is based at least in part upon the match results.

5. The method of claim 1,
wherein the response of the generating is customized based in part upon cost information specific to the access numbers.

6. The method of claim 1, further comprising:
indicating those access numbers having a lower current load within the response.

7. The method of claim 1, further comprising:
accessing a component of the network infrastructure in which problems with access numbers are reported; and
based upon data within the component, selectively excluding problematic access numbers from the response.

8. The method of claim 1, further comprising:
customizing the response based in part on historical reliability data specific to one or more of the access numbers.

9. A non-transitory machine-readable storage having stored thereon, a computer program having a plurality of code sections, said code sections executable by a machine for causing the machine to perform acts of:
establishing a telephony communication with a party responsive to a received telephone call from the party;
receiving an indicator during the telephony communication of a service region within which dial-up Internet access is requested;
retrieving access numbers associated with the service region;
determining specifications of a machine used by the party to interface with a network infrastructure which provides dialup Internet service based at least in part on information retrieved during the telephony communication;
dynamically generating a response to the querying that is customized based at least in part upon the specifications of the machine; and
when the response includes at least one access number, presenting the at least one access number to the party across the telephony communication.

10. The non-transitory machine-readable storage of claim 9, further comprising said code sections executable by the machine for causing the machine to:
establish the telephony communication, receive the indicator of the service region and present the at least one access number using an automated voice response system; and
retrieve the access numbers by querying at least one data store.

11. The non-transitory machine-readable storage of claim 10, further comprising said code sections executable by the machine for causing the machine to:
determine a modem speed and protocol of the machine, wherein said querying matches the modem speed and protocol with information in the data store related to the access numbers, and
wherein the response of the generating is based at least in part upon the match results.

12. The non-transitory machine-readable storage of claim 9, further comprising said code sections executable by the machine for causing the machine, when the response includes a plurality of access numbers, to:
present the plurality of access numbers in order based on compatibility with the specifications of the machine used by the party.

13. The non-transitory machine-readable storage of claim 9,
wherein the response of the generating is customized based in part on cost information specific to the access numbers.

14. The non-transitory machine-readable storage of claim 9, further comprising said code sections executable by the machine for causing the machine to:
indicate those access numbers having a lower current load within the response.

15. The non-transitory machine-readable storage of claim 9, further comprising said code sections executable by the machine for causing the machine to: access a component of the network infrastructure in which problems with access numbers are reported; and
selectively exclude problematic access numbers from the response based on data within the component.

16. The non-transitory machine-readable storage of claim 9, further comprising said code sections executable by the machine for causing the machine to:
customize the response based in part on historical reliability data specific to the access numbers.

17. A method for an automated voice response system to present access numbers to dial-up Internet users, the method comprising:
establishing a telephony communication with a party responsive to a received telephone call from the party;
during the telephony communication, receiving an indicator of a service area within which dial-up Internet access is requested, wherein the indicator includes automatic number identification data for the telephony communication, the automated voice response system automatically determining the service area based upon the automatic number identification data;
querying at least one data store for access numbers associated with the service area;
dynamically generating a response to the querying that is customized specifically for the telephony communication;
querying pre-existing account information associated with the party that includes designated service area;

comparing the automated determined service area with the designated service area from the account information;

when the automated determined service area is the same as the designated service area from the account information, proceeding to the querying of the at least one data store without prompting the party for additional service area information; and when the response includes at least one access number, presenting the at least one access number to the party across the telephone communication.

18. The method of claim 17, further comprising:

when the automated determined service area is not the same as designated service area from the account information, determining a city proximate to each of the service areas, and prompting the party to confirm from which of the determined cities is access desired.

19. The method of claim 17, further comprising:

before the presenting, presenting a message stating the number of access numbers within the response.

20. The method of claim 17, wherein the at least one data store of the querying comprises a data store local to the automated voice response system and a data store remote from the automated voice response system, the querying further comprising:

establishing one of the local data store and the remote data store as a primary data store and the other as a secondary data store; and when the querying is unable to access the primary data store, utilizing the secondary data store instead of the primary data store.

\* \* \* \* \*

UNITED STATES PATENT AND TRADEMARK OFFICE
CERTIFICATE OF CORRECTION

PATENT NO. : 7,936,862 B2 Page 1 of 1
APPLICATION NO. : 12/014396
DATED : May 3, 2011
INVENTOR(S) : J. Paden et al.

It is certified that error appears in the above-identified patent and that said Letters Patent is hereby corrected as shown below:

On Title Page Item (75) Inventors, "Jon Paden" should be --Jonathan Paden--

Signed and Sealed this
Sixteenth Day of August, 2011

David J. Kappos
*Director of the United States Patent and Trademark Office*